United States Patent [19]

Sugishima

[11] Patent Number: 5,768,516

[45] Date of Patent: Jun. 16, 1998

[54] NETWORK MANAGEMENT APPARATUS AND CONTROL METHOD THEREOF

[75] Inventor: Kiyohisa Sugishima, Yokohama, Japan

[73] Assignee: Canon Kabushiki Kaisha, Tokyo, Japan

[21] Appl. No.: 423,961

[22] Filed: Apr. 18, 1995

[30] Foreign Application Priority Data

Apr. 19, 1994 [JP] Japan ........................ 6-080709

[51] Int. Cl.⁶ ........................................ G06F 13/00
[52] U.S. Cl. ........................ 395/200.47; 395/200.53
[58] Field of Search ..................... 395/200.09, 800, 395/114, 200.47, 200.49, 200.59, 200.55, 200.54, 200.56, 200.53

[56] References Cited

U.S. PATENT DOCUMENTS

| | | | |
|---|---|---|---|
| 4,803,614 | 2/1989 | Banba et al. ............... | 395/600 |
| 5,060,165 | 10/1991 | Schumacher et al. ........ | 364/478 |
| 5,179,637 | 1/1993 | Nardozzi ..................... | 395/114 |
| 5,220,674 | 6/1993 | Morgan et al. .............. | 395/800 |
| 5,287,194 | 2/1994 | Lobiondo .................... | 358/296 |
| 5,371,837 | 12/1994 | Kimber et al. .............. | 395/114 |
| 5,404,199 | 4/1995 | Hirata et al. ............... | 355/204 |
| 5,467,434 | 11/1995 | Hower, Jr. et al. .......... | 395/114 |

*Primary Examiner*—Mehmet B. Geckil
*Attorney, Agent, or Firm*—Morgan & Finnegan, L.L.P.

[57] ABSTRACT

A network management apparatus and a method for controlling thereof according to the present invention, which can save a user managing output units connected onto a network. Practically, printing data and condition information are transmitted to the network management apparatus from each computer connected onto the network. According to the received condition information, the network management apparatus searches for a printer which meets conditions represented by the condition information. Thereafter, the network management apparatus transmits the printing data to the printer searched for.

6 Claims, 5 Drawing Sheets

FIG. 2

| | | |
|---|---|---|
| PRINTER SELECTION: | AUTO. | INDIVIDUAL SELECTION |
| PAPER SELECTION: | AUTO. | INDIVIDUAL SELECTION |
| NUMBER OF COPIES: | 5 | 100% |
| SCALING FACTOR: | AUTO. | |
| PRINTING OPERATION: | NON-SORT | SORT | SORT & STAPLE |
| COLORING OPERATION: | PERFECT PRINTING | | |
| | MONOCHROME | FULL-COLOR | |
| DEGREEE OF URGENCY: | A | B | C |

F I G. 4

| DEVICE ID | NETWORK ID | FUNCTION INFORMATION |
|---|---|---|
| PRINER | 0100 | OUTPUT SIZE (A4, B4...), RESOLUTION 300dpi,... |
| PRINTER | 0110 | |
| PRINTER | 0120 | |
| PRINTER | 0200 | |
| .... | .... | |
| IMAGE SCANNER | 0100 | R, G, B EACH 8 BITS, RESOLUTION 300dpi,... |
| IMAGE SCANNER | 0110 | |
| IMAGE SCANNER | 0120 | |
| IMAGE SCANNER | 0200 | |
| .... | .... | |
| FAX | 0200 | |

NETWORK MANAGEMENT APPARATUS AND CONTROL METHOD THEREOF

BACKGROUND OF THE INVENTION

1. Field of the Invention

The present invention relates to an apparatus for managing output units connected onto a network and to a control method for controlling such an apparatus.

2. Description of the Related Art

With advances in technology, an attempt has come to be made to connect units, each of which has formerly operated in standalone fashion, with one another on a network and share resources.

In the case where a client such as a personal computer causes a printer to print a color image, an operator may need to manage equipment connected to a network. For example, an operator may need to select a color printer from among a plurality of printers connected with the client on a network.

Inevitably, as the amount of equipment connected onto a network increases, the management of the equipment becomes more and more troublesome. For example, if an operator instructs his or her usual printer to print an image but this printer is being used to print another picture, the operator may fail to use an unused printer to print the image until the usual printer finishes printing the other picture. The present invention is provided to cure such a problem.

SUMMARY OF THE INVENTION

Accordingly, an object of the present invention is to provide a network management apparatus which can save a user of a network managing output units connected onto the network and moreover can improve operational environment concerned with outputting information.

Further, another object of the present invention is to provide a method for controlling such a network management apparatus.

To achieve the foregoing object, in accordance with an aspect of the present invention, there is provided a network management apparatus for managing output units and computers connected to a network, which comprises reception means for receiving a request to output information, which is sent from one of the computers to the output units, and output condition information representing conditions required for outputting the information, retrieval means for retrieving one or more of the output units, which meet output conditions represented by the received output condition information, according to the output condition information, and output means for outputting the received information to each of the retrieved one or more output units, which is retrieved by the retrieval means.

Here, in accordance with a preferred embodiment of the present invention, it is desirable that the retrieval means retrieves the output units, which meet the output conditions represented by the output condition information, in sequence by referring to management information which includes output unit information representing each of the output units connected to the network and function information representing the functions thereof. Thus, an optimum output unit, which meets the detailed conditions represented by the condition information, can be retrieved at a high speed by including information, which represents the detailed description of the functions of each of the output units, in the management information.

In the case where the retrieved output unit is in operation, it is preferable that the retrieval means retrieves the next output unit. Thereby, the output apparatuses on a network can be used in a distributed manner.

Further, preferably, the output units have at least a printing function and a facsimile transmitting function. Thereby, almost all kinds of output units can be covered.

Moreover, in the case where the retrieval means retrieves no output unit which meets the output conditions indicated by the output condition information, it is preferable that the apparatus is provided with transmission means for transmitting a predetermined message to a computer which has transmitted information to be outputted. Thereby, such a computer or an operator thereof can know the fact that the outputting of the information is not possible. Further, if necessary, the operator can establish the output conditions again.

Furthermore, in the case where an output unit, which meets the output conditions represented by the output condition information, can be retrieved by the retrieval means and information is outputted to this output unit by the output means, it is preferable that the apparatus is provided with transmission means for transmitting information, which is used to discriminate the retrieved or determined output unit from the other output apparatuses, to a computer which has transmitted information to be outputted. Thereby, the computer or the operator thereof can know the output unit which actually outputs this information.

Additionally, in accordance with another preferred embodiment of the present invention, it is preferable that the apparatus is provided with judgment means for judging whether or not information of urgency is included in the output condition information, and with interruption means for interrupting an output operation of outputting information, which should be outputted by an output unit, to the output apparatus retrieved by the retrieval means in the case where information judged by the judgment means as being of urgency is included in the output condition information and the output unit retrieved by the retrieval means is in operation. Moreover, it is preferable that after the output operation is interrupted, the information of urgency is outputted by the output means. Thereby, the apparatus can deal with a case where an urgent output operation is needed.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 2 is a diagram for illustrating an example of input condition information displayed on a screen of a display unit at the time of performing a printing operation;

FIG. 4 is a diagram for illustrating an example of the contents of resource management information used in the embodiment of the present invention.

DETAILED DESCRIPTION OF THE PREFERRED EMBODIMENT

Hereinafter, the preferred embodiment of the present invention will be described in detail by referring to the accompanying drawings.

Figure 1:
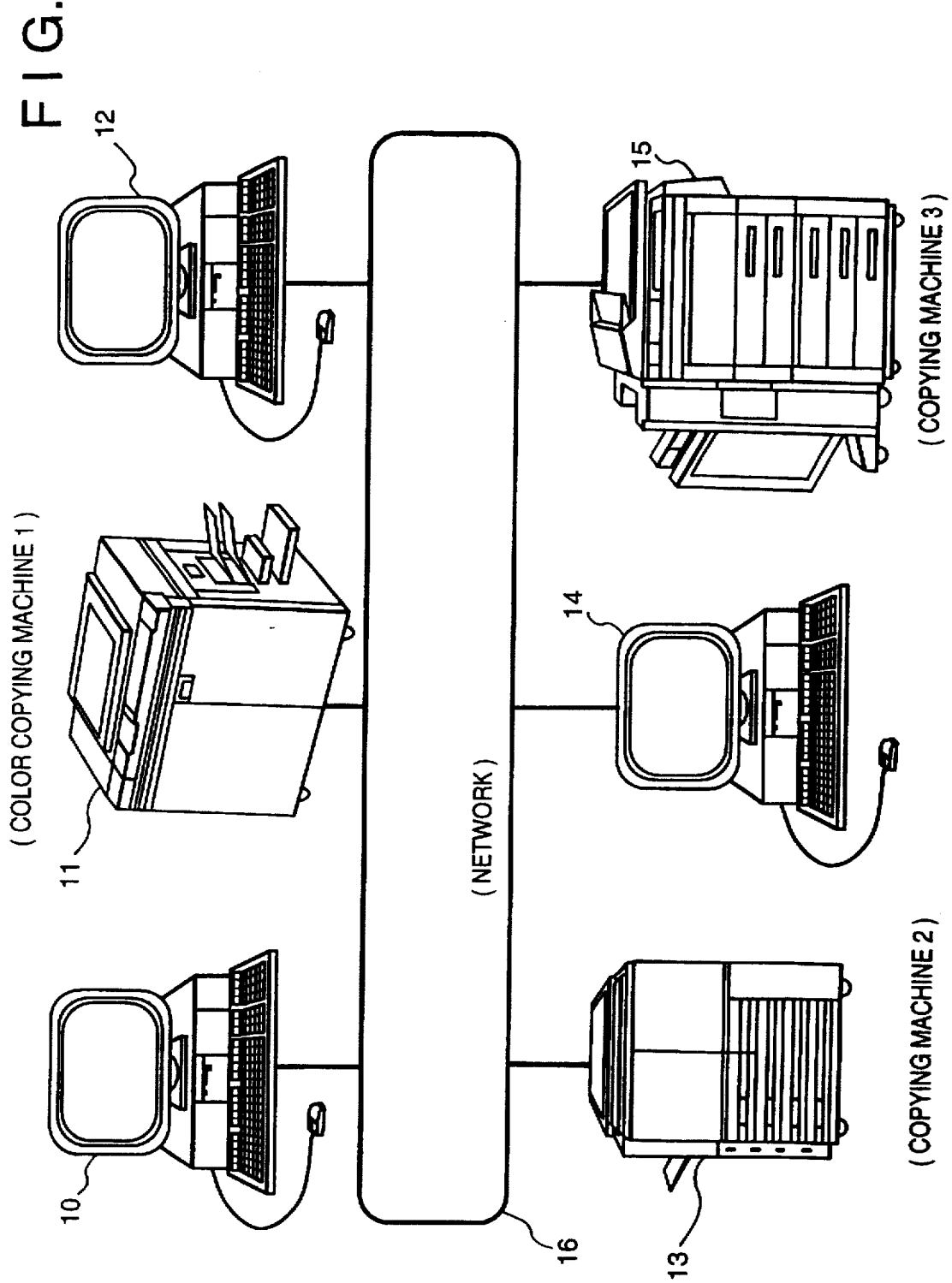
FIG. 1 is a diagram for illustrating the construction of a network in the case of employing an embodiment of the present invention.

FIG. 1 illustrates an example of the configuration of a network system, namely, the embodiment of the present invention. As shown in this figure, equipments 10 to 15 are connected with a network 16 in this system.

It should be noted that the network 16 is a well-known local area network such as token ring or CSMA/CD (carrier sense multiple access/collision detection).

In this figure, reference numerals 10, 12 and 14 designate computers; 11, 13 and 15 copying machines (namely, a machine serving as both of an original image reader and a printer).

Each of the copying machines 11, 13 and 15 has the functions of reading an original image placed on a draft reading plate, forming a copied image on predetermined recording paper and printing out the copied image and also has an interface for outputting data representing a read image to the network 16 and for receiving image data to be printed, which is outputted from the network 16.

Moreover, the copying machines 11, 13 and 15, may be of the same model or type, are, however, supposed to have different functions, respectively, in this embodiment. Namely, one of the copying machines is adapted to read an original image as a color image (displayed by using red, green and blue signals, each of which represents 8-bit data) and incorporates a full-color printer thereinto. Further, another of the copying machines is adapted to read the original image as a monochrome gray-scale image (each of the tone levels of which is represented by 8-bit data) and is able to print the gray-scale image. Moreover, still another one of the copying machines is adapted to read the original image as a binary image and to print the binary image.

Each of the copying machines 11, 13 and 15 has the functions of reading an image and printing the image. Some of the copying machines, however, have a sorting function, a perfect printing function (namely, the function of printing images on both sides of paper) and a stapling function (namely, the function of fastening a resultant copy with a staple). Incidentally, all of the copying machines do not necessarily have these functions. Namely, some of the copying machines may have only a part of these functions, though each of the others has all of these functions.

On the other hand, any of the computers 10, 12 and 14 may be used as a system management apparatus of the embodiment of the present invention. However, for the simplicity of description, it is supposed that the host computer 10 is employed as the system management apparatus and the other computers 12 and 14 are used by users of the network system to perform business operations by executing various application programs.

Meanwhile, in the case where an instruction for printing a document or an image edited and created by using the computer 12 is issued in this network system having the aforementioned configuration, information or data as illustrated in FIG. 2 is displayed on a screen of a display unit corresponding to the computer 12. In the case where an instruction for printing a read image from a copy machine via another printer is issued from a copy machine, the information or data as illustrated in FIG. 2 is displayed on a display unit of the copy machine.

While watching this screen, an operator inputs condition information regarding conditions for printing. The condition information and printing data are sent to the computer 10 connected to the network 16.

The contents or items of a menu displayed on the screen of FIG. 2 will be briefly described hereinbelow.

PRINTER SELECTION

In the case where an operator specifies no printers connected to the network 16 and leaves it to the computer 10 which of printers is used, "AUTO." is selected. In contrast, in the case where an operator selects a specific printer, "INDIVIDUAL SELECTION" is chosen. Here, when "INDIVIDUAL SELECTION" is chosen, it is necessary for displaying a list of printers connected with the network to know what printers are connected therewith. In the case of this embodiment, the computers manages equipments connected to the network 16 (incidentally, the details of the management will be described later). Thus, an inquiry command for making an inquiry about the printers connected to the network is issued from the computer 12 to the computer 10. Thereafter, the computer 12 receives the information from the computer 10 to thereby display the list of the printers on the screen of the display unit. Then, an operator selects a printer from the displayed list of the printers. Either of a keyboard and a pointing device (for example, a mouse) may be used to select a printer.

PAPER SELECTION

This row or item is used to specify the size of recording paper on which a document or an image is printed. In the case where the rectangle "AUTO." is selected, the computer 10 determines the size of the recording paper. Further, in the case where the rectangle "INDIVIDUAL SELECTION" is chosen, an operator keys in a specific size such as A4 or B4. Incidentally, if the rectangle "INDIVIDUAL SELECTION" is chosen in the row "PRINTER SELECTION", the computer 12 receives function information regarding the functions of the selected printer from the computer 10. Subsequently, a list of the sizes of recording paper available in the selected printer is displayed in order that an operator may select a specific size of the recording paper.

NUMBER OF COPIES

This row or rectangle is used to input data indicating the number of copies to be printed.

SCALING FACTOR

This row is used to establish a scaling factor employed for printing out a document or an image. In the case where the rectangle "AUTO." is selected and the size of an image to be printed exceeds A4 but the selected size of the recording paper is A4, the size of the image is reduced to the extent that the image of the reduced size can be printed within an A4 page. Moreover, on this row, there is provided a field for printing a numerical value of the scaling factor.

PRINTING OPERATION

This row has a rectangle "SORT" for causing the computer to sort documents or images when printing the documents or images (in such a manner that a first page thereof becomes the front page thereof), another rectangle "NON-SORT" for inhibiting the computer from sorting documents or images when printing the documents or images, a further rectangle "SORT & STAPLE" for causing the printer to sort documents or images when printing, and for causing the printer to fasten printed pages with a staple, and still another rectangle "PERFECT PRINTING" for indicating whether or not the printer prints documents or images on both of the surfaces of the recording paper. Incidentally, both of the functions respectively corresponding to the rectangles "SORT" and "NON-SORT" can not be selected simultaneously. In contrast, both of the functions respectively corresponding to the rectangles "SORT" and "PERFECT PRINTING" can be simultaneously selected. Namely, the functions respectively corresponding to these rectangles of some combinations can be simultaneously selected if such combinations are within reason.

COLORING OPERATION

This row has a rectangle "MONOCHROME" for causing a printer to print a picture as a monochromatic image, and another rectangle "FULL-COLOR" for causing a printer to print the picture as a color image. Even if an operator edits or creates color documents or images, the document or image is printed according to the corresponding relations among colors used in the document or image and predetermined monochrome patterns in the case where the rectangle "MONOCHROME" is selected. Incidentally, even in the case where original information representing a monochromatic document or image (namely, an original document or image is monochromatic) but the rectangle "FULL-COLOR" is selected, the document or image is printed by a full-color printer. However, a resultant printed document or image is monochromatic.

DEGREE OF URGENCY

This row is used to specify the degree or rank of urgency of the printing of a document or image. In the case of this embodiment, the rectangle "A" corresponds to a case where a reproduced image should be immediately obtained. In the case where the rectangle "A" is specified and a printer to be used for the printing of the reproduced image has been being used to print a picture having a lower degree of urgency, the operation of printing the picture is ceased and interrupted. Further, in the case where the rectangle "B" is selected and the printer, which meets the current conditions represented by the condition information, is in operation, namely, is printing a picture, an operation of reproducing a image having the degree of urgency corresponding to the rectangle "B" is performed after the printer finishes printing the picture. Moreover, a document or image having a degree of urgency corresponding to the rectangle "C" may be printed further later. The degree of urgency of a document or image is determined or specified in this way.

The contents of the menu for establishing printing conditions displayed on the screen are as described hereinabove. For instance, when the rectangle "INDIVIDUAL SELECTION" on the row "PRINTER SELECTION" is selected and a specific printer is chosen, the computer 12 receives the function information regarding the functions of the chosen printer from the computer 10. The form of the menu displayed on the screen changes according to the received function information. For example, in the case where the selected printer does not have the stapling function, the rectangle "SORT & STAPLE" on the row "PRINTING OPERATION" is displayed by, for instance, being dimmed in order to inform an operator of the fact that the function corresponding to the rectangle "SORT & STAPLE" can not be selected. This is because there is no sense in selecting the function corresponding to the rectangle "SORT & STAPLE". That goes for the functions respectively corresponding to the rectangles "SORT" and "PERFECT PRINTING" on the row "PRINTING OPERATION" and the rectangle "FULL-COLOR" on the row "COLORING OPERATION", too.

Additionally, menu items to be established are not limited to those described hereinabove. For example, the system is adaptable so that a printer having a high printing speed may be selected. The system can deal with such a case by including printing speed information, which represents the printing speed (sheets/minute) of each individual printer, in the function information of FIG. 4.

Figure 3:
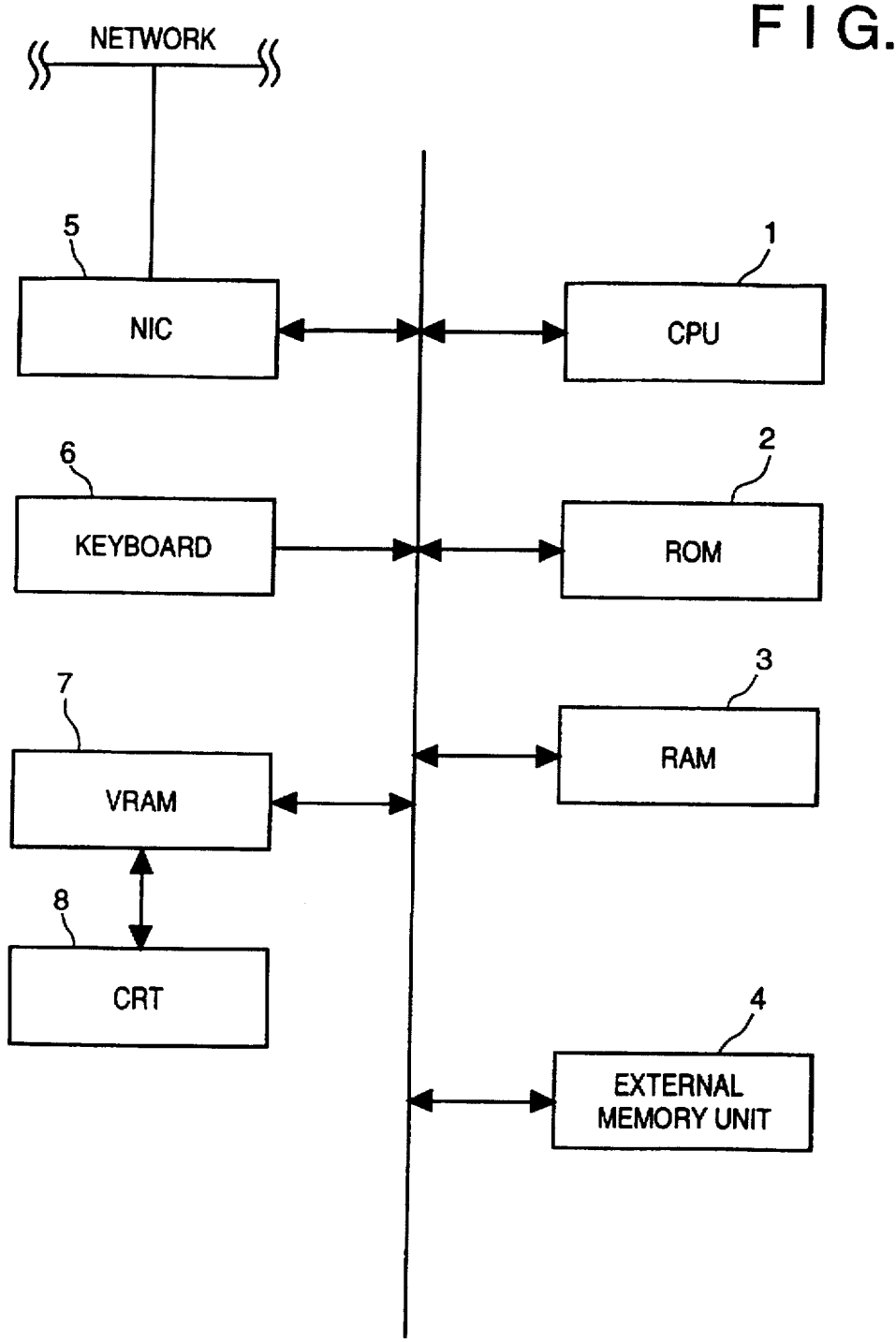
FIG. 3 is a diagram for illustrating the configuration of a computer which is a management apparatus embodying the present invention.

Next, the configuration of the computer 10 will be described hereunder by referring to FIG. 3. Incidentally, each of the other computers 12 and 14 has basically the same configuration as illustrated in this figure.

In this figure, reference numeral 1 designates a central processing unit (CPU); 2 a read-only memory (ROM) for storing a bootstrap program, character fonts and so on therein; 3 a random access memory (RAM) to be loaded with various programs and also used as a work area for the CPU 1; and 4 an external memory unit (for instance, a mass storage device such as a hard disk unit, a magneto-optic disk or the like) for storing an operating system (OS) and processing programs (to be described later) therein and for also storing printing data received from each of the other computers. Further, in this external memory unit 4, resource management information representing resources on the network as illustrated in FIG. 4 is stored (incidentally, the details thereof will be described later). Moreover, reference numeral 5 denotes a network interface card (NIC) for giving information to and receiving information from the network; 6 a keyboard; 7 a video RAM (VRAM); and 8 a display unit (or a cathode ray tube (CRT)) for displaying an image loaded into the VRAM 7.

As described previously, when the computer or the copy machine receives a predetermined command from another computer connected to the network, the computer 10 performs a processing according to the received command. For instance, when receiving a command to request the transfer of information regarding a printing operation of the color copying machine 11 serving as a printer, the computer 10 transmits the information to the computer having issued the command. Thus, a program for interpreting the command therefor and performing a processing is loaded from the external memory unit 4 into the RAM 3.

Those skilled in the art, however, can easily hit upon the procedure for analyzing the command and transferring the information from the foregoing description. Herein after, an operation of the computer 10 in the case of receiving the condition information (established on the screen of FIG. 2) and the printing data from another computer will be described.

First, the resource management information representing resources on the network, which is stored in the external memory unit 4, will be described hereunder.

The resource management information has a structure as illustrated in, for example, FIG. 4 and namely, consists of a device identification (ID) representing the logical functions of each device, a network ID representing the ID of each individual physical device on the network, and the functional information thereof.

The network ID is information required for specifying each individual device and is unique to a corresponding device. Further, the network ID may be the number of each device as illustrated in this figure. In some cases, a user may give a name to and manage the network ID corresponding to each device. Moreover, the device IDs are managed as illustrated in this figure, because of the facts that when paying attention to a copying machine, the copying machine can be regraded as a unit into which an image scanner and a printer are incorporated and that needless to say, each of the copying machines of this embodiment serves as a printer for each of the computer and also can be used singly as an image scanner or the like.

Therefore, a device having the network ID of "0100" is registered as both of a printer and an image scanner.

Incidentally, a facsimile (of course, this facsimile can be connected to the network of the embodiment), which is not shown in FIG. 1, is provided with an image scanner for reading an original image and with a printer. Thus, as illustrated in FIG. 4, a device having the network ID of "0200" is managed as a printer, an image scanner and an facsimile (FAX). In this figure, the device ID "FAX" indicates that the corresponding device has the function of transmitting and receiving images through a circuit or line. Consequently, facsimile transmission and reception can be performed directly by the computer connected to the network.

Further, the function information regarding a device ID is stored and managed in a predetermined format. For example, as described previously, the function information regarding a device ID "PRINTER" comprises information indicating whether or not a corresponding device or printer has a perfect printing function, information indicating whether or not the printer has a stapling function, information indicating whether or not the printer has a sorting function, information indicating which of a full-color output and a monochrome output the printer has, information representing the size of a recordable part of recording paper (including roll paper), and information representing a resolution.

Moreover, the function information regarding a device ID "IMAGE SCANNER" comprises information indicating which of a monochrome binary image reading type scanner and a color image scanner which reads each of R, G and B components as 8-bit data, and a reading resolution and so on.

Incidentally, the function information regarding a device ID "FAX" includes information indicating which of a Group 3 facsimile and a Group 4 facsimile a corresponding device is, and so forth.

Figure 5:
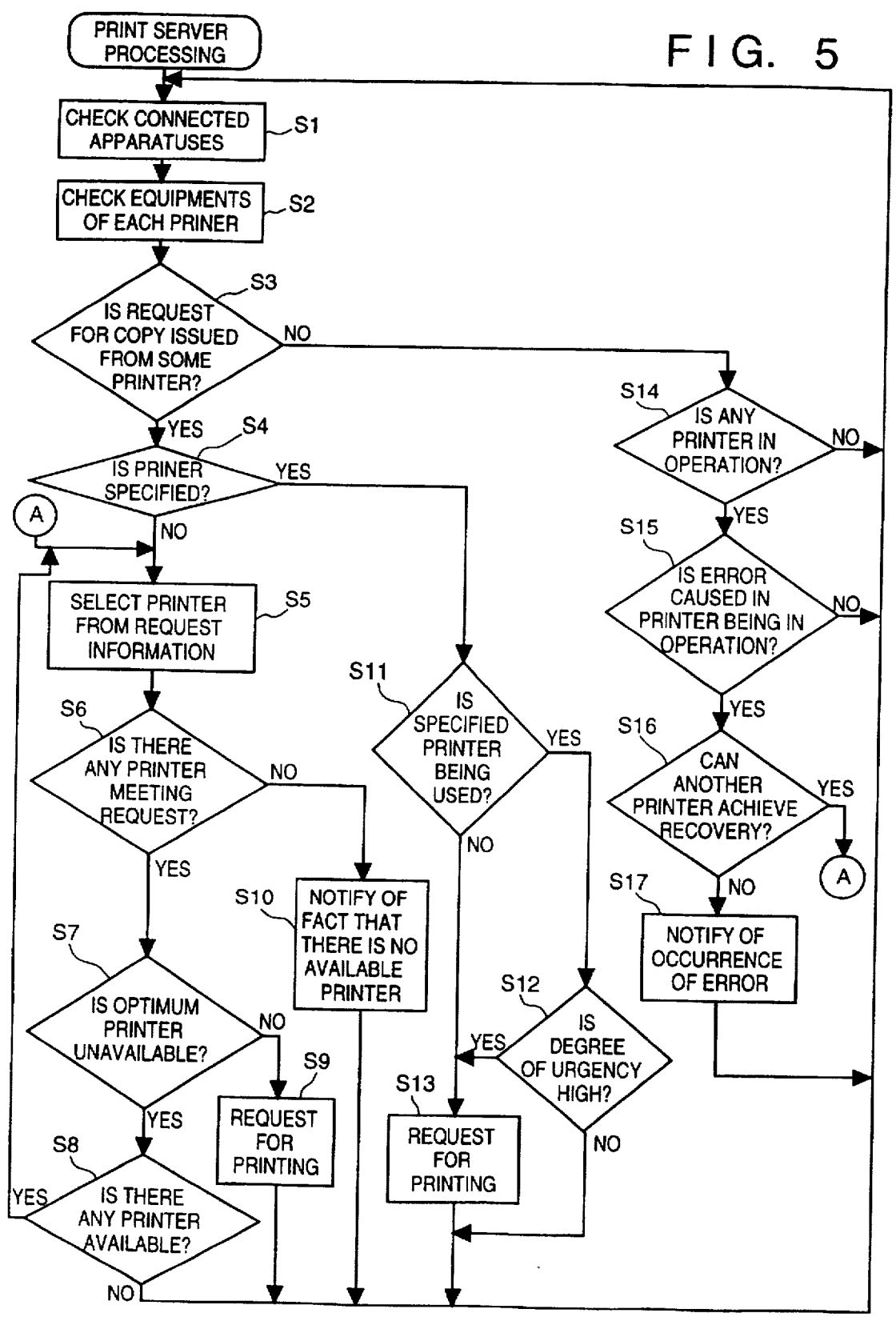
FIG. 5 is a flowchart for illustrating a part of an operation of the management apparatus embodying the present invention.

Next, an operating procedure of the host computer 10 employed as the system management apparatus of this embodiment in the case of receiving the condition information and the printing data according to the resource management information will be described hereinbelow by referring to a flowchart of a process illustrated in FIG. 5.

First, it is checked in step S1 according to the resource management information what apparatuses are connected to the network (incidentally, as described above, the copying machine is treated as the printer in the case of this embodiment). Subsequently, it is checked (in step S2) what equipments and functions each apparatus judged in step S1 as an image input/output apparatus has (for instance, whether or not each apparatus has a color input/output function, what printing speed each apparatus has, whether or not each apparatus has a perfect printing function, and so on). Then, it is judged in step S3 whether or not a request for a printing of an image is issued from some computer or a copy machine. If not, the process advances to step S14 whereupon it is judged whether or not some printer is currently in operation. If no printers are in operation, the process returns to step S1 to check the apparatuses.

In contrast, if some printer is in operation, it is judged (in step S15) whether or not an error occurs in the printer. If an error takes place therein, it is judged (in step S16) whether or not an error recovery can be achieved by another computer. In the case where it is judged that the error recovery is impossible, the computer 10 notifies an originating computer or a copy machine, which has transmitted the printing data, of an occurrence of an error (or what error occurs). Conversely, if a printer being capable of achieving an error recovery is found, the process advances to step S5.

Incidentally, at that time, the computer 10 transmits to the originating computer a message indicating that an error occurs in a printer, which is currently performing a printing operation, and another printer carries out the rest of the printing operation for the former printer. Moreover, condition information sent to the former printer, in which an error occurs, together with the printing data is referred to for the purpose of searching for the latter printer which can achieve an error recovery. In other words, the condition information is held in the external memory unit or the like until the operation of printing the printing data is finished.

Meanwhile, in the case where a request for a printing of an image is issued from some computer (namely, the computer 10 receives condition information and printing data from some computer), such information and data are once stored in the external memory unit 4. Then, it is judged in step S4 according to the stored condition information whether or not a printer for printing an object to be printed is specified. Namely, it is judged whether the function corresponding to the rectangle "AUTO," on the row "PRINTER SELECTION" is selected, or a specific printer is selected.

In the case where no printer is specified, namely, in the case where the function corresponding to the rectangle "AUTO," on the row "PRINTER SELECTION" is selected, the process advances to step S5 whereupon a printer meeting requested information or conditions (e.g. paper size and designated resolution) indicated by the condition information is searched for. If there is such a printer (naturally, there is the possibility that a plurality of printers meet the conditions), the process advances to step S7 whereupon it is judged whether or not such a printer is currently available. The cases where such a printer is unavailable are cases where the power supply for such a printer is turned off and where such a printer is performing a printing operation. In these cases, the process advances to step S8 whereupon it is judged whether or not there is another available printer. If there is an available printer, the process advances to step S5.

Further, in the case where no printers meeting the conditions are found, or in the case where a printer meeting the conditions is found but the found printer is unavailable, the received printing data and the condition information are placed in a printing queue. Then, the process returns to step S1. Moreover, in the case where an optimum printer is available, a request for printing is issued in step S9 to the optimum printer. Furthermore, the printing data is transmitted by following a predetermined procedure to thereby print the printing data. The reason for searching an available printer except the optimum printer executed at step 8 is described below. In the case where the rectangle "MONOCHROME" on the row "COLORING OPERATION" is selected, printers for printing monochrome images are searched for a printer meeting the conditions. However, if no printers meeting the conditions are found, or if a printer for printing a monochrome image, which meets the conditions, is found but the found printer does not come to be immediately available for printing, a color printer (or a color copying machine) is selected. This is because even a color printer can print a monochrome image.

In the case where no printer meeting the request is found in step S6, namely, in the case where there is no printer which meets the conditions indicated by a user correspondingly to the printing data, the process advances to step S10 whereupon the computer 10 informs a requesting computer, which has issued a request for printing the printing data, of such a fact and establishes the conditions again.

In contrast, in the case where a definite printer is specified in the condition information, the process goes from step S4 to step S11 whereupon it is judged whether the specified printer is printing the printing data of another job. If so, the process advances to step S12 whereupon the degree of urgency of the received printing data at issue is compared with that of urgency of the printing data of this job, which is currently being printed by the specified printer. Further, it is judged whether the priority of the former printing data is higher than that of the latter printing data. If so, the process advances to step S13 whereupon at that time, the operation of printing the latter printing data is interrupted (incidentally, if a page is currently being printed at that time, the printing of this page is finished). Moreover, the former printing data having a higher priority, which corresponds to a job having a higher priority (namely, a job at issue) is printed by the specified printer.

Incidentally, although not described hereinbefore, a printing operation or a job having a higher priority (or a higher degree of urgency) is performed by interrupting another printing operation or job having a lower priority (or a lower degree of urgency). Upon completion of the printing operation having a higher priority, the interrupted printing operation is resumed. Moreover, the processing described hereinabove is only a part of the processing to be performed by the computer 10. Actually, requests or commands for printing are sent from a plurality of computers to the computer 10, namely, the network management apparatus. Printing data respectively corresponding to the commands are stored in the external memory unit 4 in proper time series. Thereafter, the printing data are read therefrom in sequence and are outputted to printers respectively corresponding to the requests or commands.

Further, according to the foregoing description of the embodiment, an operation of printing data by increasing the degree of urgency thereof is performed on the precondition that a definite printer is specified. However, even in the case where the option "AUTO." is selected on the row "PRINTER SELECTION", the apparatus may be adapted to be able to perform such an operation. Incidentally, generally, in the case where printing data having a higher degree of urgency is printed and an operator does not know what printer prints the printing data, there is caused a problem that the operator needs to watch each of the printers. Thus, in the case where the option "AUTO." is selected (incidentally, the degree of urgency is able to be established), the computer having issued the request for printing may be informed of the printer determined for printing, when this printer available for printing is finally searched for and the printing of the data having a higher degree of urgency is commenced, namely, in step S9 or S13. Thereby, even in the case of printing data by increasing the degree of urgency thereof, the operator can know what printer is used for printing the data. Consequently, the problem described just hereinbefore can be resolved.

Moreover, in the case of the aforementioned embodiment, an operator manually selects whether the printing data is printed as a monochrome image or as a color image, by using the menu displayed on the screen of FIG. 2. Such an automatic selection, however, may be made by automatically judging whether image information to be printed is represented by using color codes and whether the image information is represented as color components such as YMCK or RGB, and further being based on a result of this judgement.

Furthermore, in the case of the aforementioned embodiment, the host computer 10 serving as the system management apparatus captures image information to be transmitted and transmits the image information. Instead of this, the system may be adapted in such a manner that an equipment, which requests for image input/output, transmits only control information to the system management apparatus and subsequently, the system management apparatus informs the equipment of a corresponding output unit and thereafter, the equipment directly gives image information to and receives image information from the output unit without the intervention of the system management apparatus.

As described above, in the case of this embodiment of the present invention, in the case where image data is printed by a plurality of logical printing units connected to the network, an operator merely selects functions which he needs, or inputs a command, whereby an appropriate printing unit is automatically selected and thus the image data comes to be able to be printed. Consequently, a desired result can be obtained without considering what functions each individual printing unit has.

Incidentally, the printing operation of printing image data has been mainly described hereinabove. An operation to be performed at the time of reading an image is different from the operation of printing image data. This is because it is necessary for reading an original image to set the original image in a copying machine and to select the copying machine in which the original image is set. Namely, in the case of reading an image, there is not the option "AUTO." when selecting an image scanner.

However, it would be easily thought that in the case where a plurality of facsimiles are connected to the network and a facsimile transmission is performed, an image can be read by performing substantially the same operation as the printing operation. Incidentally, in the case of a facsimile, a row used for inputting the number of a destination terminal or a row used for selecting the number of a destination terminal from preliminarily registered numbers becomes necessary as an input menu item.

Furthermore, in the case of the aforesaid embodiment, the "printing unit" means a printing mechanism and its control portion which are provided in a copying machine. A single printer may be employed as the printing unit as long as this printer can be connected to the network. This is because a device being capable of interpreting a command issued by each computer (actually, the computer 10) and executing the command may be employed as the printing unit.

Additionally, in the case where a plurality of (personal) computers and a plurality of output units are connected to the network, the system may be configured in such a manner that the corresponding relation between the computers and the output units is preliminarily established as default option and that when a personal computer issues a request for an output, this personal computer can use the corresponding output unit preferentially. For that purpose, the corresponding relation between the ID of each computer and that of a corresponding printer preferentially connected thereto may be established, and stored and managed. Further, when a request for an output is issued from a computer, it is first judged whether or not the corresponding printer can print image data to be outputted.

Moreover, in the case of the aforementioned embodiment, when an error occurs in a printer which is outputting a reproduced image, a printer controller notifies a computer, which has made a request for outputting, of the abnormality (namely, the occurrence of an error). However, the printer controller may be adapted to issue a message for asking the nearest computer to the printer to eliminate the abnormality, simultaneously with this. For this purpose, the printer controller may have physical distance information representing the physical distance between the computers and the information input/output units and further, when there is an abnormality is caused in an information input/output unit, the printer controller may send an abnormality elimination asking message to the nearest computer to this information input/output unit according to the physical distance information.

Furthermore, in the case where an additional input/output unit is added to the system and is connected to the network, works for additionally connecting to the network are performed in the computer 10. At that time, the table of FIG. 4 may be updated by inputting various information to the system interactively.

Incidentally, a computer assigned to the system management apparatus does not perform only system management. This computer permits a system management program and application programs, which are used for creating ordinary documents and drawing an image, to concurrently run.

Further, when the computer used as the system management apparatus comes down, or when this computer is busy with the execution of another application program, another computer may conduct the system management, instead of the assigned computer. This substitute computer seizes an opportunity of performing the system management when there is no response from the assigned computer or when a request for performing the system management by using a substitute computer is made.

Moreover, in the case of the aforementioned embodiment, when each computer issues a command for printing an image, the condition information and the printing data are transmitted therefrom to a specific management apparatus (in the case of this embodiment, the computer 10). In the foregoing description, the format (or printer language) of printing data has not been described. It is, however, preferable that printing data sources (namely, the computers 12 and 14) connected to the network output printing data of the same format. Further, the computer 10 receives the printing data of the common or same format. Thus, the computer 10 translates the received printing data into printer language inherent in a printer which prints the received printing data and outputs results of the translation. This results in that employ only one kind of a program suffices for printer driver software which runs in each of the computers connected onto the network. For example, even in the case where a printer employing another printer language is newly connected to the network, the system can deal with such a case only by adding an interpret program for the computer 10 thereto.

Incidentally, an example of the technique for converting data of a predetermined format into data peculiar to a printer is GDI (graphic data interface) used in MS-Windows developed by Microsoft Corporation in the United States of America.

As described above, in the case of this embodiment, a computer connected to the network manages requests for output, which are issued from the other computers connected thereto, and the performance of the output units connected thereto, thereby obtaining optimum combinations of the computers and the output units. Thus, loads imposed on the computers and an operator can be reduced. Consequently, an efficient networking can be achieved.

In addition, as stated above, the present invention can save a user of a network managing output units connected onto the network and moreover can improve operational environment concerned with outputting information.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A network management apparatus for managing printing operations of printers connected to a network, comprising:

means for receiving, from a printing data output device connected to the network, a printing request including printing data and condition information representing printing conditions;

means for selecting one of the printers connected to the network which can perform a printing operation under printing conditions represented by the received condition information; and means for causing the selected printer to perform a printing operation based on the printing data from the printing data output device;

wherein the selecting means selects a monochrome printer which prints monochrome data when the received condition information represents monochrome printing, the selecting means selects a color printer which prints color data when the received condition information represents color printing, and, when the monochrome printer cannot perform the printing operation and the received condition information represents monochrome printing, the selecting means selects a color printer and said means for causing causes the selected color printer to print the printing data.

2. The network management apparatus according to claim 1, further comprising means for storing function information representing printing functions of the printers connected to the network.

3. The network management apparatus according to claim 2, wherein the selecting means selects one of the printers by referring to the stored function information.

4. A method of managing printing operations of printers connected to a network, comprising the steps of:

receiving, from a printing data output device connected to the network, a printing request including printing data and condition information representing printing conditions;

selecting one of the printers connected to the network which can perform a printing operation under printing conditions represented by the received condition information; and causing the selected printer to perform a printing operation based on the printing data from the printing data output device;

wherein a monochrome printer which prints monochrome data is selected when monochrome printing is represented by the received condition information, a color printer which prints color data is selected when color printing is represented by the received condition information, and, when the monochrome printer cannot perform the printing operation and monochrome printing is represented by the received condition information, a color printer is selected and the selected color printer prints the printing data.

5. The method according to claim 4, further comprising a storing step of storing function information representing printing functions of the printers connected to the network.

6. The method according to claim 5, wherein, in the selecting step, one of the printers is selected by referring to the stored function information.

* * * * *